Dec. 29, 1931.  J. MONTAGNON  1,838,278
SPANNER WRENCH
Filed Dec. 29, 1930

INVENTOR
J. Montagnon
BY
ATTORNEY

Patented Dec. 29, 1931

1,838,278

UNITED STATES PATENT OFFICE

JULE MONTAGNON, OF HAMDEN, CONNECTICUT, ASSIGNOR TO AMERICAN TELEPHONE AND TELEGRAPH COMPANY, A CORPORATION OF NEW YORK

SPANNER WRENCH

Application filed December 29, 1930. Serial No. 505,398.

This invention relates to spanner wrenches which are particularly adapted for use in the connection and disconnection of hose couplings.

One of the objects of the invention consists in the provision of a spanner which may be attached to a hose coupling without interfering with the use of the hose, and provides a convenient means of coupling and uncoupling the hose without resorting to separate tools which might be lost or mislaid and unavailable when needed, or which are unadapted for use in coupling or uncoupling hose.

Another object is to provide a spanner which may be collapsed and left on the hose without interferring with the usual hose operations.

The novel features which are considered characteristic of this invention are set forth with particularity in the appended claim. The invention itself, both as to its organization and method of operation, together with other objects and advantages thereof, will be further explained in the following description having reference to the accompanying drawings consisting of the following figures:

Figure 3:
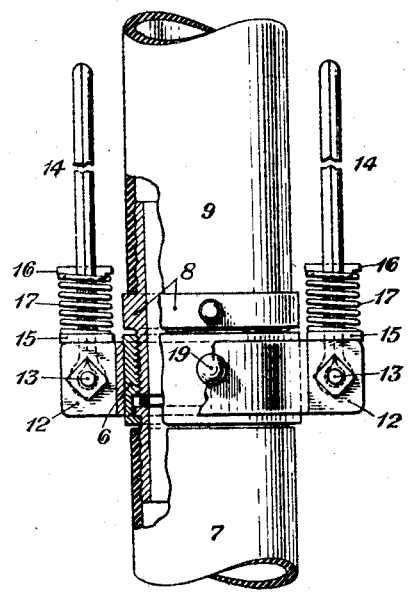
Fig. 3 is a view similar to Fig. 2, showing the device applied to a hose coupling with the handles of said device in collapsed position.

Referring to the drawings, in which the improved device is illustrated, the reference 5 designates a collar or clamp which may be made of suitable metal. This collar is adapted to be applied to a screw-threaded ring which may be of the general type shown at 6. The screw-threaded ring may be attached in a manner well kown in the art to a hose 7. For the purpose of illustration, it may be assumed that it is desired to join hose 7 and hose 9 by means of the coupling 6, on hose 9, as shown in Fig. 3, and which will be presently described.

The collar 5 may be divided into two semi-circular sections or bands 10 and 11 and each section may be provided with a pair of lugs 12, 12, which extend laterally from the ends of the semi-circular portions. The lugs of each section lie in a plane parallel to those of the other section, and coinciding apertures are provided through the companion lugs lying on each side of the sections. Securing means, such for instance as bolts 13, extend through these apertures and nuts may be applied to their threaded ends as shown. The bolts 13 provide pivotal points for the handles 14 which extend outwardly a sufficient distance therefrom to give suitable gripping surfaces to be held during the manipulation of the device. The handles 14 are shown, for the purpose of illustration, as being formed from straps of metal folded upon themselves and having eyes formed at their inner ends which encircle their respective bolts 13 to provide therewith a hinged connection. The outer portions of the handles may be suitably fastened together to form an integral structure. It will be understood that said handles may be formed, if desired, from a single strap of suitable thickness.

Figure 1:
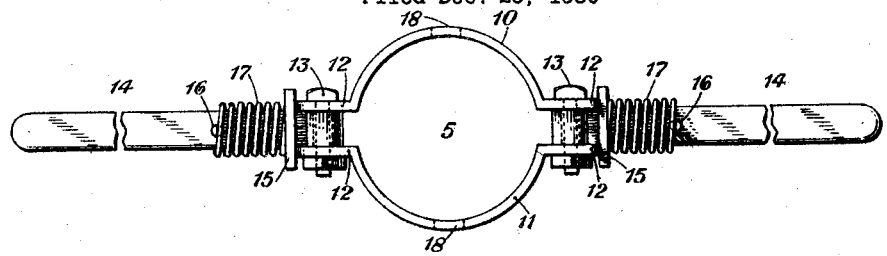
Figure 1 is a plan view showing the device with its handles extended and its parts in a position to be applied to a hose coupling.
Figure 2:
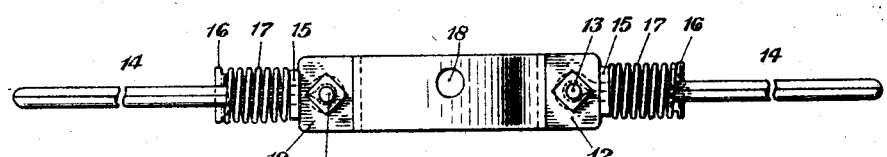
Fig. 2 is an elevational view of Fig. 1.

A plate 15, which may be of rectangular form, is carried at the inner end of each of the handles 14. These plates are of sufficient length to overlap the ends of the companion pair of lugs 12, against which they abut. A fixed pin 16 extends through each of the handles, and a helical spring 17 encircling the handles is positioned between the pins 16 and the plate 15. These springs are under suitable compression to exert sufficient pressure upon the plates 15 to force them against the ends of the companion pairs of lugs to maintain the handles in an extended position as shown in Figs. 1 and 2. The springs perform a like function when the handles are rotated to the right or left to maintain said handles in collapsed positions. In Fig. 3, the handles have been rotated from an extended position in one direction to a collapsed position, and the plates 15 are shown as being seated against the edges on one side of the companion pairs of lugs. If the handles are rotated from their extended positions in the other direction, the plates will be seated on the opposite edges of said pairs of lugs. The handles in their collapsed positions lie in close and parallel relation to the lengths of hose and require a minimum space. The corners of the lugs may be formed to facilitate the rotation of the handles.

An aperture 18 is provided through the approximate center of the band of each of the semi-circular portions 10 and 11 of the collar for the purpose of engaging the oppositely positioned studs 19 of the hose coupling whereby it may be rotated to make a union with another coupling.

In the application of the improved device to a coupling, the bolts are withdrawn from the collar to permit the separation of its two sections. The coupling may then be placed between the collar sections with the studs of the coupling registering in the holes in the spanner and the bolts are reapplied and tightened about the coupling.

The provision of a collar encircling the coupling and engaging the studs in the manner outlined protects the studs, and eliminates the battering thereof and the resulting difficulty in using the conventional type wrench because of battered or broken studs. A wrench similar to that described in connection with the threaded ring 6 may be also used with the threaded ring 8. This would provide for holding the latter member while the ring 6 is being joined to it.

While there is shown and described herein a certain preferred form of the invention by way of illustration, it is understood that it is not limited or confined to the precise details of construction herein described and delineated, as modification and variation may be made within the scope of the appended claim without departing from the spirit of the invention.

What is claimed is:

In a spanner for hose couplings having studs thereon, a coupling-engaging collar divided into two sections having apertures therethrough in which said studs register, means for clamping said sections about a coupling, handle members pivotally mounted on said means and arranged to be seated in selected extended positions at right angles to the axis of the collar and in collapsed positions parallel to the axis of the collar, and a helical spring carried by and movable with each of said handle members for exerting pressure to maintain the handle members seated in the positions selected.

In testimony whereof, I have signed my name to this specification this 24th day of December, 1930.

JULE MONTAGNON.